US006750699B2

(12) United States Patent
Escobar-Bowser et al.

(10) Patent No.: US 6,750,699 B2
(45) Date of Patent: Jun. 15, 2004

(54) POWER SUPPLY INDEPENDENT ALL BIPOLAR START UP CIRCUIT FOR HIGH SPEED BIAS GENERATORS

(75) Inventors: Priscilla Escobar-Bowser, Plano, TX (US); Julio E. Acosta, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/961,214

(22) Filed: Sep. 21, 2001

(65) Prior Publication Data

US 2002/0057127 A1 May 16, 2002

Related U.S. Application Data

(60) Provisional application No. 60/235,117, filed on Sep. 25, 2000.

(51) Int. Cl.[7] .................................................. H02J 11/00
(52) U.S. Cl. ........................ 327/530; 327/534; 327/535
(58) Field of Search ................................. 327/530, 534, 327/535, 538, 540, 541, 542, 74, 54; 323/313, 314, 316, 312, 315; 330/288

(56) References Cited

U.S. PATENT DOCUMENTS

| | | | | | |
|---|---|---|---|---|---|
| 4,795,918 | A | * | 1/1989 | Menon et al. | 327/539 |
| 5,654,665 | A | * | 8/1997 | Menon et al. | 327/541 |
| 5,831,473 | A | * | 11/1998 | Ishii | 327/530 |
| 5,903,141 | A | * | 5/1999 | Tailliet | 323/312 |
| 5,926,062 | A | * | 7/1999 | Kuroda | 327/538 |
| 6,316,971 | B1 | * | 11/2001 | Ohashi | 327/74 |

* cited by examiner

*Primary Examiner*—Tuan T. Lam
*Assistant Examiner*—Hiep Nguyen
(74) *Attorney, Agent, or Firm*—Alan K. Stewart; W. James Brady, III; Frederick J. Telecky, Jr.

(57) ABSTRACT

A start up circuit includes: a diode Q0; a first transistor Q1 coupled in series with the diode Q0; a first resistor R4 coupled in series with the first transistor Q1; a second transistor Q2 having a control node coupled to a control node of the first transistor Q1 and coupled to a node between the first transistor Q1 and the first resistor R4; and a second resistor R2 coupled in series with the second transistor Q2 such that a current in the second transistor Q2 is independent of a voltage applied across the diode Q0, the first transistor Q1, and the first resistor R4.

6 Claims, 1 Drawing Sheet

POWER SUPPLY INDEPENDENT ALL BIPOLAR START UP CIRCUIT FOR HIGH SPEED BIAS GENERATORS

This application claims priority under 35 USC §119 (e) (1) of provisional application No. 60/235,117 filed Sep. 25, 2000.

FIELD OF THE INVENTION

This invention generally relates to electronic systems and in particular it relates to start up circuits for high speed bias generators.

BACKGROUND OF THE INVENTION

A very important part in the design of operational amplifiers is the bias generator. Bias generators provide a reference current that sets the quiescent current for the given design. Usually bias generators can be independent of supply voltages, so references like Vbe (base to emitter voltage) or Vt (threshold voltage) are used. One important part of the design of the bias generator is the startup circuitry. Start up circuits will force the bias generator to operate in the non-zero state. They do this by putting a small current that will force the circuit to operate and keep it from turning off.

In the world of high speed circuits an essential requirement for bias generators is to be able to tolerate the high frequency feed through of the signals that will ripple back from the main circuit. The signals that ripple back can cause the bias generator current to spike up or to almost turn off. The bias generator has to be able to absorb these signals and recover in a very short amount of time. As soon as the bias generator starts to turn off, the start up circuit should catch up bringing the bias generator current back to its normal state. The start up circuit has to be fast for a very high-speed circuit. What one would ambition is a bias generator that could speed up as a result of a fast transient but after that overshoot it never undershoots, i.e., a 50–60 degrees of phase margin. This is why in high-speed design extra compensation to the bias generator is not desirable.

FIG. 1 shows a prior art PTAT bias generator with a high speed start up circuit. The start up circuit 20 is always providing a current to the bias generator 22, as opposed to "non-high speed" start up circuits which are disconnected when they are not needed. The reason for having the circuit providing a constant start up current is to fulfill the requirement for a fast start up circuit when dealing with high-speed signals. One thing to keep in mind when designing the startup circuitry is not to limit the power supply's voltage range beyond what the core circuitry already does. Emitter degeneration resistors 30 and 32 (R3) are usually used to improve the matching of the transistors in the start up. Typically, the voltage drop across them is no more than 10 $V_T$ where $V_T$=kT/q. For voltage drops larger than 10 $V_T$ the improvement achieved is almost insignificant and it starts to limit the power supply voltage range.

Prior art start up circuits such as the one shown in FIG. 1 have the problem of being power supply dependent. The start up reference current in transistor Q2 will be determined by the difference in voltage between the power supplies Vcc and Vee minus one diode drop across transistor Q1 divided by a set of resistors R1 and R4 (R1+R4, of which R4 usually dominates). This is imposed into the base of transistor Q2 setting the start up current. Notice how the start up current will also be power supply dependent. This can be a problem on a wide supply voltage application. If the start up current becomes large it will introduce a substantial error in the reference current as a result of the impedance drop in the PNP mirrors 24 and 26. This error will affect the currents throughout the whole circuit and increase the power consumption. On the other hand, if it gets too small it will fail to keep the bias generator from recovering fast after a fast transition ripples back to it nearly turning it off.

SUMMARY OF THE INVENTION

A start up circuit includes: a diode; a first transistor coupled in series with the diode; a first resistor coupled in series with the transistor; a second transistor having a control node coupled to a control node of the first transistor and coupled to a node between the first transistor and the first resistor; and a second resistor coupled in series with the second transistor such that a current in the second transistor is independent of a voltage applied across the diode, the first transistor, and the first resistor.

DETAILED DESCRIPTION OF PREFERRED EMBODIMENTS

Figure 2:
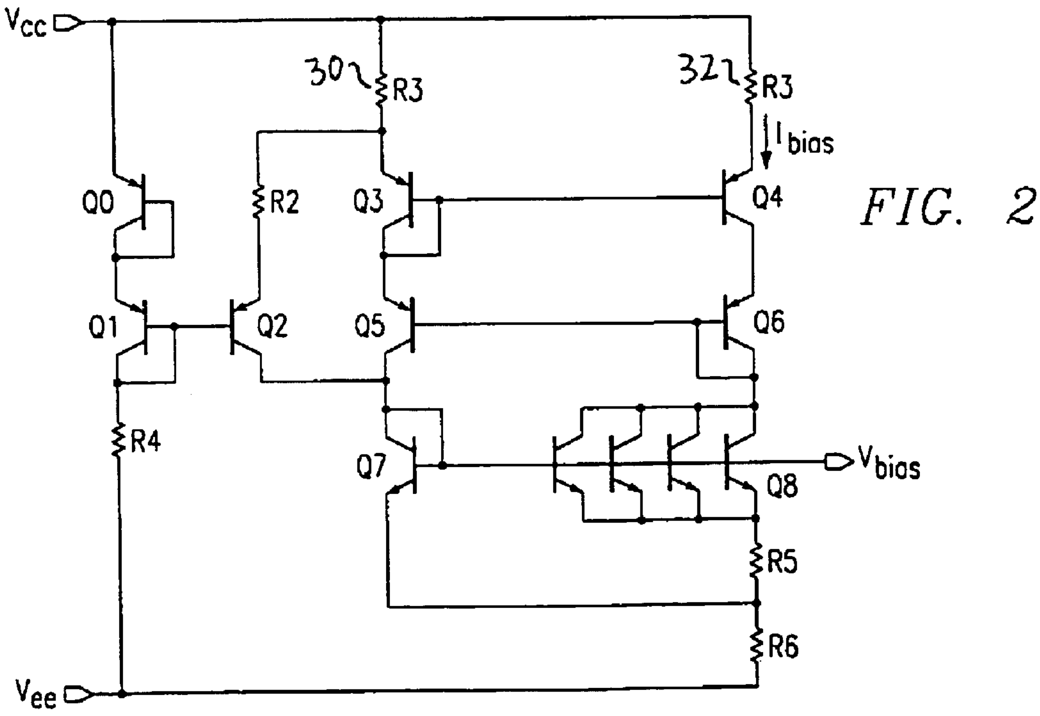
FIG. 2 is a schematic circuit diagram of a preferred embodiment bias generator with a high speed, power supply independent, start up circuit.

The preferred embodiment start up circuit is shown in FIG. 2. The circuit of FIG. 2 includes transistors Q0–Q8; resistors R2–R6; supply voltages Vcc and Vee; and output bias voltage $V_{bias}$. This circuit provides a way of creating a start up current independent of power supplies by fixing its reference without having too large a voltage drop across the emitter degeneration resistors 30 and 32 (R3). The preferred embodiment start up circuit is supply independent, fast, and has as low of head room requirements as the prior art.

Figure 1:
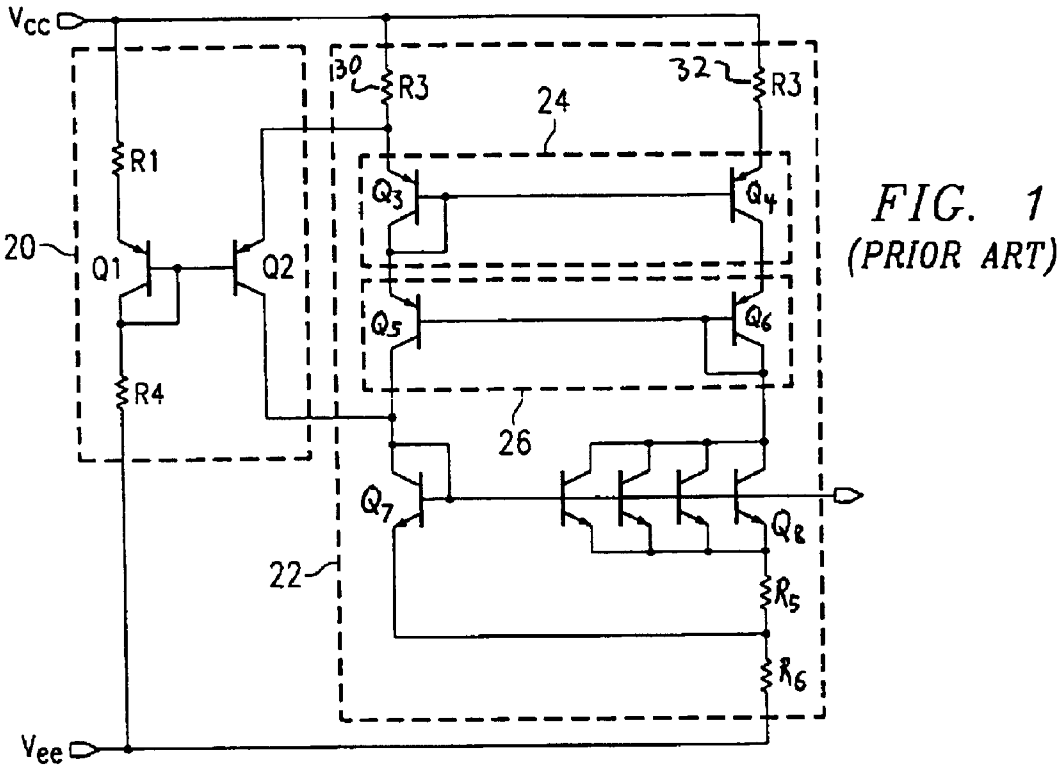
FIG. 1 (PRIOR ART)
FIG. 1 is a schematic circuit diagram of a prior art bias generator with a high speed start up circuit.

For the prior art circuit shown in FIG. 1, the reference current $I_{bias}$ is determined by:

$$I_{bias} = \frac{V_T * \ln(4)}{R_5}$$

This equation ignores the error introduced by the start up circuit 20. The start up circuit 20 lowers the equivalent output impedance at the collector of transistor Q5, which causes a small error making the bias current $I_{bias}$ slightly larger than what is predicted by the above equation. As can be seen, the reference current $I_{bias}$ is independent of the power supplies. The problem is that the start up circuit 20 is not, and as stated before, it will influence the bias current $I_{bias}$. The reference current of the startup circuit 20 (the current through resistor R4) when ignoring base current error, is set up by $$I_{\text{ref\_start\_up}} = \frac{V_{cc} + V_{ee} - V_{be1}}{R_1 + R_4}$$

Where $V_{be1}$ is the voltage across transistor Q1. Usually resistor R4 is large enough that it dominates over resistor R1. Now the equation for the start up current (the current through transistor Q2) is as follows:

$$I_{\text{start\_up}} = I_{\text{ref\_start\_up}} \Big/ \exp\left(\frac{I_{\text{ref\_start\_up}} * R_1 - I_{bias} * R_3}{V_T}\right)$$

The above equation shows that the current through the collector of transistor Q2 (the start up current $I_{start\_up}$) is dependent on the power supply, since it depends on $I_{ref\_start\_up}$. As mentioned before, this case can adversely affect the bias current $I_{bias}$. One possible solution would be to substitute a diode for transistor R1, fixing the voltage drop to one $V_{be}$. However, this change by itself will not do the job, and will introduce a big problem. If a diode is put where resistor R1 is, a voltage $V_{be}$ will be put across resistor R3. This will unbalance the circuit creating a larger current through one side and a huge start up current. The start up current cannot be larger than the bias current or it will affect the whole bias circuit.

Looking at the preferred embodiment solution shown in FIG. 2, it can be seen that resistor R1 has been substituted by a diode Q0, but also there is added a resistor R2. The diode Q0 serves as a constant voltage drop device that provides a voltage drop independent of the voltage supply fluctuations. Solving for the start up current:

$$I_{start\_up} = \left(V_{be\_q0} + V_T * \ln\left(\frac{I_{ref\_start\_up}}{I_{start\_up}}\right) - I_{bias} * R_3\right) \Big/ R_2$$

Where $V_{be\_q0}$ is the voltage drop across diode Q0. The above equation is a transcendental equation. Notice though that $I_{ref\_start\_up}$ can be set up to a value very close to $I_{start\_up}$. The closer this ratio ($I_{ref\_start\_up}/I_{start\_up}$) is to one, the closer $\ln(I_{ref\_start\_\_up}/I_{start\_up})$ is to zero. Then the start up current
becomes:

P1 $I_{start\_up} = (V_{be\_Q0} - I_{bias} * R_3)/R_2$ $I_{bias}$*R3 is usually chosen to be around 0.2V. If this is the case then:

$$\boxed{I_{start\_up} = (V_{be\_Q0} - 0.2)/R_2}$$

Where, $$V_{be} = V_T * \ln\left(\frac{Ic}{Is}\right)$$

In this case, Ic is equal to $I_{ref\_start\_up}$, which for FIG. 2 is defined by the following equation.

$$I_{ref\_start\_up} = \frac{V_{cc} + V_{ee} - V_{be1} - V_{be0}}{R_4}$$

Now an explanation is presented on how to set up the circuit. First of all, the bias current should be set up. Then choose the value of resistor R4 to obtain the desired start up reference current. Remember to have the start up current and the reference start up current to be the same value. It is a good practice to make the startup current around 25% of the bias current. Resistors R3 are emitter degeneration resistors used to improve the matching of transistors Q3 and Q4. Usually they are chosen such that the voltage drop across them is around 10 VT (from 0.2 to 0.25 V). The improvement in matching is insignificant for voltage drops larger than that. The start up current should be similar to the reference start up current so that resistor R2 can be determined by solving the start up current equation shown below:

$$\boxed{I_{start\_up} = (V_{be\_q0} - 0.2)/R_2}$$

The preferred embodiment solution provides a very fast start up circuit, all bipolar that is power supply independent and that does not take any unnecessary headroom. It is also very simple to set up and a definite improvement over previous start up circuits.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A circuit comprising:

a diode;

a first transistor coupled in series with the diode;

a first resistor coupled in series with the first transistor;

a second transistor having a control node coupled to a control node of the first transistor and coupled to a node between the first transistor and the first resistor;

a second resistor coupled in series with the second transistor;

a first branch of a current mirror coupled in parallel with the second transistor and the second resistor;

a third resistor coupled in series with the second resistor; and a third transistor coupled in series with the second transistor.

2. The circuit of claim 1 wherein the first and second transistors are bipolar transistors.

3. The circuit of claim 1, wherein the first and second transistors are PNP bipolar transistors.

4. A circuit comprising:

a constant voltage drop device;

a first transistor coupled in series with the constant voltage drop device;

a first resistor coupled in series with the first transistor;

a second transistor having a control node coupled to a control node of the first transistor and coupled to a node between the first transistor and the first resistor;

a second resistor coupled in series with the second transistor;

a first branch of a current mirror coupled in parallel with the second transistor and the second resistor;

a third resistor coupled in series with the second resistor; and a third transistor coupled in series with the second transistor.

5. The circuit of claim 4 wherein the first and second transistors are bipolar transistors.

6. The circuit of claim 4 wherein the first and second transistors are PNP bipolar transistors.

* * * * *